United States Patent [19]

Propster

[11] 4,292,064
[45] Sep. 29, 1981

[54] GLASS BATCH FEEDING USING A FLUIDIZED BED FOR PREDRYING AGGLOMERATES

[75] Inventor: Mark A. Propster, Gahanna, Ohio

[73] Assignee: Owens-Corning Fiberglas Corporation, Toledo, Ohio

[21] Appl. No.: 135,950

[22] Filed: Mar. 31, 1980

[51] Int. Cl.³ ............................................... C03B 3/00
[52] U.S. Cl. ........................................ 65/27; 65/134; 65/335; 165/104.16
[58] Field of Search ........................... 65/27, 335, 134; 165/104 F

[56] References Cited

U.S. PATENT DOCUMENTS

| | | | |
|---|---|---|---|
| 4,099,953 | 7/1978 | Rondeaux et al. | 65/27 X |
| 4,225,332 | 9/1980 | Tsay | 65/27 X |
| 4,248,615 | 2/1981 | Seng et al. | 65/27 |
| 4,248,616 | 2/1981 | Seng et al. | 65/335 |

OTHER PUBLICATIONS

Glass; Dec. 1978, "Agglomeration in the Glass Industry".

*Primary Examiner*—Arthur D. Kellogg
*Attorney, Agent, or Firm*—Ronald C. Hudgens; Patrick P. Pacella

[57] ABSTRACT

A process and apparatus for the manufacture of glass is disclosed. Glass batch agglomerates are formed, predryed, preheated and then fed to a glass melting furnace. The predrying is carried out in a fluidized bed predryer to prevent aggregation of the wet agglomerates.

7 Claims, 2 Drawing Figures

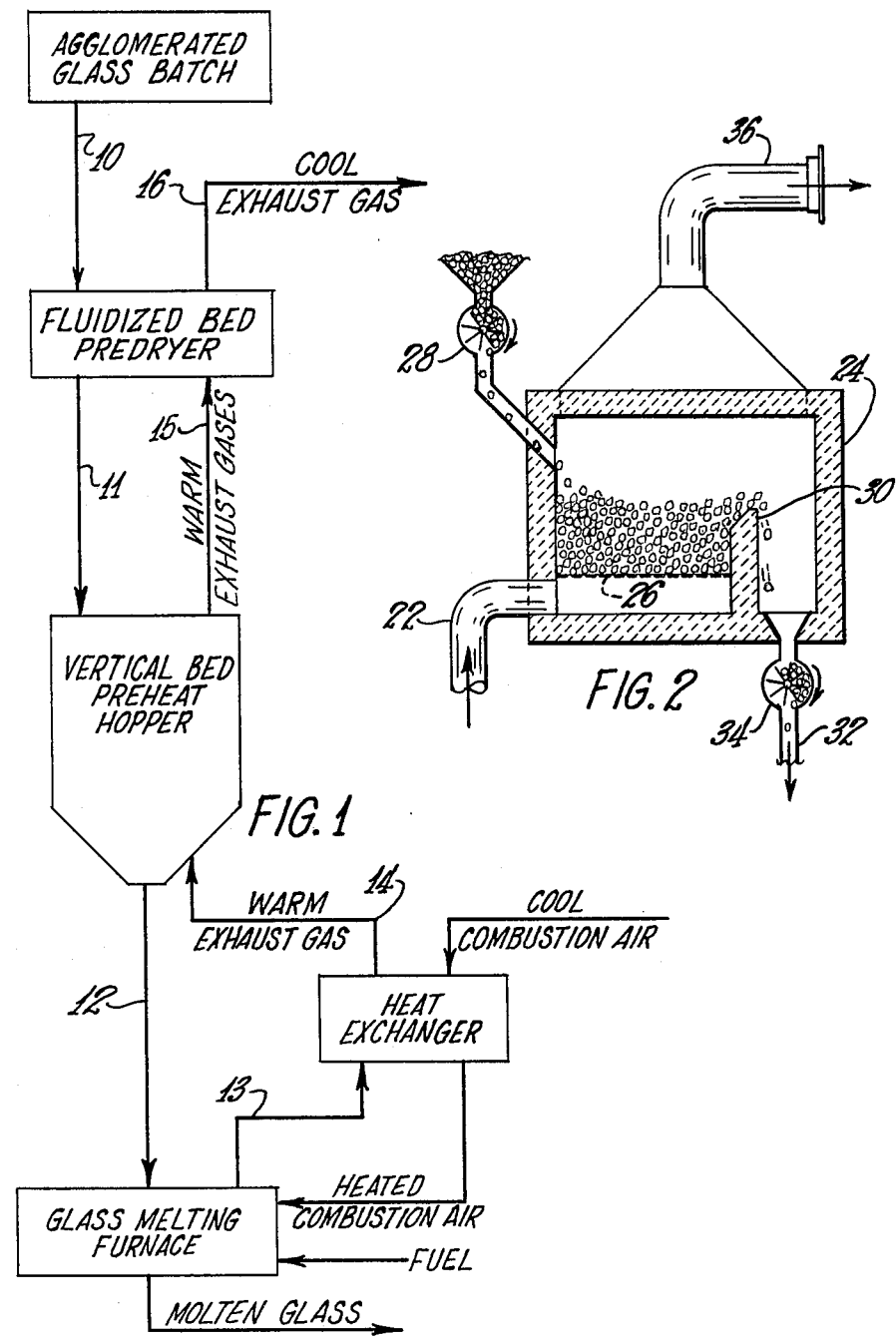

GLASS BATCH FEEDING USING A FLUIDIZED BED FOR PREDRYING AGGLOMERATES

TECHNICAL FIELD

This invention relates to a process for predrying agglomerates which then are preheated and fed to a glass melting furnace.

BACKGROUND ART

Methods are known in the art for glass manufacturing wherein glass-forming, batch ingredients are compacted into agglomerates and then are heated in a chamber by a direct contact with flue gases from a glass melting furnace so as to produce free-flowing agglomerates which are then conveyed and discharged to the glass melting furnace. These agglomerates are composite, integral, self-supporting masses consisting essentially of all the substantial batch materials and may take the form of balls, extrusions, discs, briquettes, and pellets. The pellets are discharged to a vertical bed contained within a chamber and furnace flue gases pass, in direct contact with and countercurrently to, downwardly moving pellets of the bed to preheat them.

One method known in the art to form the agglomerates is to combine the glass forming batch ingredients with a liquid such as caustic or water. While most teachings of the prior art work well for many glass batch formulations, some teachings are entirely unsuitable for certain agglomerated glass batch formulations. This unsuitability is especially acute in instances of agglomerating certain glass batch formulations with water to form pellets.

In the context of drying and heating liquid-containing, glass batch agglomerates with flue gases from a fossil fuel fired melting furnace, the most desirable process equipment of the prior art is a shaft type heater, or chamber, i.e., a vertical bed of substantial height, and preferably a bed in which the agglomerates flow downwardly through the chamber and in which the flue gases flow countercurrent to the agglomerates, to substantially continuously, in a single processing operation, dry and preheat them.

Some glass batch agglomerates are, however, unstable and substantially continuous drying and heating in a single operation in a vertical bed is not obtainable. When such liquid-containing glass batch agglomerates are processed in direct contact with flue gases from a glass melting furnace, the wet agglomerate containing portion of the bed may aggregate into a strong, rather massive, monolithic type structure, or structures, which plug the shaft heater. This unacceptably necessitates shutdown.

DISCLOSURE OF INVENTION

According to this invention, the glass batch agglomerates are predryed in a fluidized bed prior to heating in a shaft type heater. The heating medium in the fluidized bed can be flue gases from a variety of sources. For example, the flue gases can come from a fossil fuel fired melting furnace; its regenerator, recuperator, or vertical shaft preheat hopper; a forehearth; or from a burner independent of the melting furnace. Other sources of heat such as the flue gases from a curing oven also can be employed.

According to this invention, it is possible to predry the wet agglomerates with flue gases prior to preheating the agglomerates. This predrying step takes place in a fluidized bed and substantially eliminates any aggregation of the wet agglomerates that may occur. This results from the fact that in the fluidized state pellets are dried without substantial pellet to pellet contact. Furthermore, the motion in the fluidized bed is sufficient to break any bonds which may form between pellets. Thus, individual, free flowing pellets with high integrity are discharged from the fluidized bed predryer into the pellet preheat hopper.

BRIEF DESCRIPTION OF THE DRAWINGS

FIG. 1 is a flow diagram of the fluidized bed predryer of this invention in connection with a conventional preheat hopper and glass melting furnace.

FIG. 2 illustrates the fluidized bed predryer of this invention in more detail.

BEST MODE OF CARRYING OUT INVENTION

Generally, this invention is employed in a glass melting furnace from which molten glass issues. A shaft-type preheat hopper maintains a vertical bed of agglomerates, with the preheat hopper preferably containing an upper substantially cylindrical portion and a lower inverted frusto-conical portion. Hot exhaust gases are conveyed to a lower portion of the preheat hopper and passed countercurrently to the gravitationally downwardly flow of the agglomerates therein so as to preheat the agglomerates to an elevated temperature. The heated agglomerates are discharged from the lower portion of the preheat hopper and without significant cooling, are directly transmitted to a glass melting furnace.

FIG. 1 shows a fluidized bed predryer as it functions between a conventional rotary disk pelletizer (agglomerated glass batch) and a preheat hopper. The agglomerated glass batch is slightly above room temperature and is continuously fed countercurrently to the flow of warm exhaust gases in the predryer. The agglomerates and exhaust gas are contacted for a time sufficient in the fluidized state to dry the pellets or agglomerates to a moisture content low enough to prevent aggregation of the agglomerates and to provide free flowing agglomerates for the preheat hopper. The agglomerates fed to the predryer generally have a moisture content ranging from 5 to 20 percent by weight and the agglomerates leaving predryer 1 normally have a moisture content ranging from 0 to 15 percent. The temperature of the gas fed to the predryer generally ranges from 300° F. to 700° F. The agglomerates then are fed to the preheat hopper and then to a glass melting furnace as described above.

In FIG. 1, agglomerated glass batch 10 is continuously fed countercurrently to the flow of warm exhaust gas 15 in the predryer. Predried agglomerates 11 then are fed countercurrently to the flow of warm exhaust gases 14 in the preheat hopper. Heated agglomerates 12 then are discharged to a glass melting furnace. Hot exhaust gases 13 from the glass melting furnace are passed through a heat exchanger prior to entering the preheat hopper. Cool exhaust gases 16 leaving the fluidized bed predryer are vented to the atmosphere or to a dust collector.

FIG. 2 shows gas inlet 22 feeding directly to the lower part of fluidized-bed predryer 24 through grate 26. Agglomerated glass batch is introduced into the upper part of fluidized bed 24 through rotary vane 28. The predried agglomerates are discharged by means of adjustable over-flow weir 30 through discharge chute 32 equipped with rotary vane 34. The cool exhaust gases exit from predryer 24 through stack 36.

In the preferred embodiment of this invention, the gas inlet to the predryer is fed directly from the preheat hopper. If the temperature of these gases is too hot or cold, additional gases can be fed to the predryer. For example, hot flue gases from the glass melting furnace or any other source can be fed directly to the preheat hopper by a conduit. Similarly, cool air also can be fed to the predryer to maintain a desired temperature or prevent overheating. If the gases are too hot, melting or sintering of the agglomerates can occur.

Another technique for operating the pellet predrying portion of the system is in a fluidized-fixed bed mode (not shown). The pellets are first fluidized for a sufficient period of time to dry the surface of the pellets and raise the pellet surface temperature above the gas dew point temperature. Pellets treated in this mode then can be de-fluidized and their predrying continued in a fixed-bed with countercurrent gas flow. Pellets must remain in the fixed bed until sufficient moisture is removed so that the pellet can be transferred to the preheat hopper without loss in pellet integrity.

INDUSTRIAL APPLICABILITY

Agglomerating glass batch is produced in an agglomerator which is any conventional piece of equipment available in the art for combining glass forming batch ingredients and a liquid such as water or caustic into agglomerates. Typically, the amount of water in the agglomerates will range from 5 to 20 percent by weight. Preferably, the agglomerator will be a conventional rotary disk pelletizer. When manufacturing pellets, it is preferred to pass the pellets through a suitable sizing device such that the pellets to be further processed generally have a maximum dimension in the range of about ¼ to 1 inch and most desirably between ⅜ to about ⅝ inch. The agglomerated glass batch is at room temperature and is continuously fed countercurrently to the flow of exhaust gas in the predryer.

In operation, combustion gas is introduced into the lower part of the fluidized bed through a grate with sufficient pressure drop to maintain a well fluidized bed. Agglomerated glass batch is introduced into the upper part of the fluidized bed through a rotary vane. The flow of the gases and agglomerated batch are countercurrent to each other. The predried agglomerates are discharged by means of an adjustable over-flow weir in the fluidized bed and the cool gases exit through the top of the fluidized bed. A blower or fan may be employed to pull the exhaust gases from the predryer or to maintain a negative pressure in the predryer. The agglomerates are heated to a minimum temperature in excess of the gas dew point temperature by this exchange and have sufficient moisture removed to provide free flowing agglomerates to the preheat hopper.

The agglomerated glass batch leaves the bottom of the fluidized bed predryer and through a rotary vane is fed continuously, countercurrently to the flow of exhaust gas in the preheat hopper. The predryer agglomerates and exhaust gases are contacted for a time sufficient so that cool exhaust gases are leaving the preheat hopper. The pellets or agglomerates are heated to a temperature ranging from about 900° F. to 1,250° F. by this exchange.

The agglomerated batch is continuously fed countercurrently to a flow of hot exhaust gas in a preheat hopper. The preheat hopper is an upright cylindrical chamber with a conical bottom having a pellet inlet and a gas outlet at the top and a pellet outlet and gas inlet at the bottom. The temperature of the gas is about 1,200° F. While in the preheat hopper, the pellets and hot exhaust gas are intimately contacted for a time sufficient so that the cool exhaust gas leaving the heat exchanger is about 500° F. Under the conditions, the agglomerates are heated to about 1,200° F. The agglomerates then are fed to a glass melting furnace as described above.

I claim:

1. A glass manufacturing process comprising the steps of:
   forming liquid-containing glass batch agglomerates;
   charging the agglomerates to a predrying fluidized bed,
   withdrawing the agglomerates from the fluidized bed and charging them to a preheat hopper;
   withdrawing the agglomerates from the preheat hopper and feeding them to a glass melting furnace;
   withdrawing flue gases from the glass melting furnace and passing them through the preheat hopper to heat the agglomerates therein; and
   withdrawing the flue gases which have passed through the preheat hopper and passing them through the fluidized bed to predry the agglomerates therein.

2. A process according to claim 1 wherein the predrying is carried out until the agglomerates have a moisture content ranging from 0 to 15.

3. A process according to claim 1 wherein the flue gases from the preheat hopper are directed to the fluidized bed and then exhausted from the fluidized bed.

4. A process according to claim 1 wherein flue gases are directed from a glass melting furnace to the preheat hopper, from the preheat hopper to the fluidized bed and then exhausted from the fluidized bed.

5. An apparatus for producing molten glass comprising:
   means for forming glass batch into agglomerates;
   a fluidized bed predryer;
   means for supplying the agglomerates to the fluidized bed predryer;
   a vertical bed preheat hopper;
   means for supplying the agglomerates from the predryer to the preheat hopper;
   a glass melting furnace;
   means for supplying the agglomerates from the preheat hopper to the glass melting furnace;
   means for supplying flue gases from the glass melting furnace to the preheat hopper; and
   means for supplying flue gases from the preheat hopper to the predryer.

6. An apparatus according to claim 5 wherein the means for supplying flue gases to the predryer is a conduit from an upper portion of the vertical bed preheat hopper to a lower portion of the fluidized bed predryer.

7. An apparatus according to claim 5 wherein the means for supplying flue gases to the preheat hopper is a conduit from an upper portion of the glass melting furnace to a lower portion of the vertical bed preheat hopper.

* * * * *